(12) United States Patent
Cedervall et al.

(10) Patent No.: US 8,973,057 B2
(45) Date of Patent: Mar. 3, 2015

(54) METHOD AND EQUIPMENT FOR PROVIDING UNICAST PREPARATION FOR IPTV

(75) Inventors: Mats Cedervall, Harnosand (SE); Bo Astrom, Stockholm (SE); Peter Edlund, Ronninge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 895 days.

(21) Appl. No.: 12/995,760

(22) PCT Filed: Jun. 5, 2008

(86) PCT No.: PCT/SE2008/050669
§ 371 (c)(1),
(2), (4) Date: Dec. 2, 2010

(87) PCT Pub. No.: WO2009/148370
PCT Pub. Date: Dec. 10, 2009

(65) Prior Publication Data
US 2011/0083153 A1   Apr. 7, 2011

(51) Int. Cl.
  H04N 7/16   (2011.01)
  H04W 36/00   (2009.01)
  H04L 29/06   (2006.01)
(52) U.S. Cl.
  CPC ........ H04L 65/4076 (2013.01); H04L 65/1083 (2013.01)
  USPC .............................. 725/62; 455/436; 455/437
(58) Field of Classification Search
  None
  See application file for complete search history.

(56) References Cited

U.S. PATENT DOCUMENTS

| | | |
|---|---|---|
| 2006/0200576 A1 | 9/2006 | Pickens et al. |
| 2007/0101012 A1 | 5/2007 | Li et al. |
| 2008/0109853 A1 | 5/2008 | Einarsson et al. |
| 2008/0119172 A1 | 5/2008 | Rao et al. |
| 2009/0042576 A1* | 2/2009 | Mukherjee et al. ........... 455/436 |
| 2009/0196213 A1* | 8/2009 | Zhong et al. .................. 370/312 |
| 2009/0313382 A1* | 12/2009 | Bouazizi ....................... 709/231 |
| 2011/0047285 A1* | 2/2011 | Kampmann et al. .......... 709/231 |

FOREIGN PATENT DOCUMENTS

| | | | | |
|---|---|---|---|---|
| WO | WO 2006136203 A1 * | 12/2006 | ............... | H04Q 7/22 |
| WO | WO 2007068290 A1 * | 6/2007 | ............... | H04H 9/00 |
| WO | 2007/101473 A1 | 9/2007 | | |
| WO | WO 2008046348   * | 4/2008 | ............. | H04L 12/28 |

OTHER PUBLICATIONS

3GPP, "Technical Specification Group Services and Systems Aspects; Enhancements to IMS Service functionalities facilitating multicast bearer services", (Release 8), Dec. 17, 2007, pp. 1-19, vol. SA WG2, No. V8.0.0, Sophia-Antipolis Cedex; France.*
Riede, C. et al., "Session and Media Signaling for IPTV via IMA," Feb. 15, 2008, XP55014265.

* cited by examiner

*Primary Examiner* — Nathan Flynn
*Assistant Examiner* — Omar S Parra
(74) *Attorney, Agent, or Firm* — Coats & Bennett, PLLC (57) ABSTRACT

A method for providing switching of a media session transmitted from a content server to a user equipment from a multicast to a unicast bearer. A preparation trigger recognised by the user equipment triggers a preparation phase wherein an application server prepares for an upcoming switch by re-configuring the media session and by providing the re-configuration data to the user equipment. Subsequent to the preparation phase, a second trigger triggers a release phase, wherein the multicast bearer is released, and the media session is resumed by the unicast bearer.

26 Claims, 6 Drawing Sheets

METHOD AND EQUIPMENT FOR PROVIDING UNICAST PREPARATION FOR IPTV

TECHNICAL FIELD

The present invention relates generally to a method and nodes adapted for enabling a smooth switching of a media session delivery from a multicast- to a unicast bearer. The invention also relates to a method and nodes adapted for scheduling the suggested switching method.

BACKGROUND

IPTV is a technology used for delivery of broadcasted TV services over an IP network, typically a broadband access network. The predominant IPTV service today is Broadcast TV, wherein normal non-IPTV bearers, as well as additional bearers with low penetration, are transmitted from a super head-end to end user receivers, such as e.g. a Set Top Box (STB) connected to a TV screen, over a broadband network.

Figure 1:
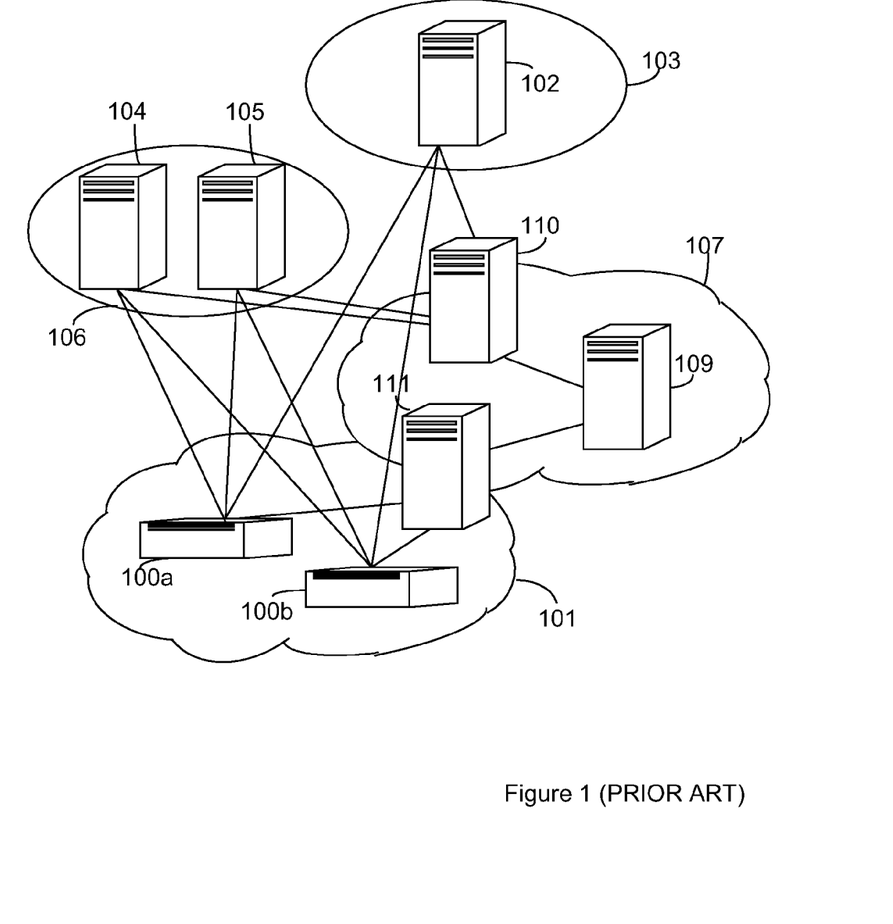
FIG. 1 illustrates an IMS based network architecture for delivery of multimedia services to end users provided with a STB, according to the prior art.

One way of delivering IPTV services to the end users is over an IP multimedia subsystem (IMS) based network architecture. FIG. 1 illustrates a simplified IMS based network architecture for delivery of multimedia services to end users, each of which is provided with a STB. In the figure a plurality of IMS enabled STBs 100a, 100b of an access domain 101 have access to multimedia services via an Application Server (AS) 102 of a Media and Service Discovery Platform 103. The services are controlled by Media Control Functions (MCF) 104, and delivered by Media Delivery Functions (MDF) 105 of a Media and Delivery Platform 106. An IMS core subsystem 107, comprising conventional Call Session Control Functions (CSCF), including Proxy-CSCFs (P-CSCF) 108, Interrogation-CSCSs (I-CSCF) 109, and Serving-CSCFs (S-CSCF) 110, controls the IPTV services, which may be delivered independently from different types of underlying IP based transport networks. It is to be understood that for simplicity reasons, nodes which may be compulsory for proper operation of delivery and control of IPTV services but which are not necessary for the understanding of the switching mechanisms which is the scope of this document have been omitted.

In order to minimize the bandwidth required for these transmissions and to minimize the resources required by the access network and in the aggregated transport network it is desirable to use multicast techniques. There are, however, a number of situations, such as for example when an end user is tuned in to a personalised TV service, and where it is necessary to switch to unicast stream while the end user is watching TV, distributed over a multicast connection. Examples of such cases are, e.g. during Network-Personal Video Recording (N-PVR) or when personalised advertising is applied. Live TV may be enabled by the Internet Group Management Protocol (IGMP), while Video on Demand (VoD) is another service which typically is enabled by the Real Time Streaming Protocol (RTSP). VoD allows a user to watch a program on a more individual basis. By using trick play functions or commands, such as e.g. pause, slow-motion and wind/rewind, a user will have full control of a media stream transmitted via unicast.

According to known multicast techniques, an end user receiving a multicast service may have been configured to instruct the transmitting side to leave the present bearer and to join the new one, either by transmitting one Internet Group Management Protocol (IGMP) message, as proposed in the IGMP version 3 standards, or in two separate messages, as proposed in previous versions. Such a procedure may be applicable for both wire-line access and mobile access.

A method for performing a switching from multicast to unicast, according to the prior art TISPAN standards, will now be described in more detail, with reference to FIG. 2. In the figure a User Equipment (UE) 100, e.g. a STB, is receiving streamed media content, delivered from a Content or Service Provider (not shown), over an IP based network, typically an IMS based broadband access network, via a content server, which in this context is referred to as a MCF/MDF 105.

In an initial step 2:1, some trigger initiates a setup of a unicast bearer. According to the described method, this may be achieved by transmitting a re-invite message to a P-CSCF 108 in a next step 2:2, which is forwarded to an AS 102, such as e.g. a SCF, in a subsequent step 2:3. The re-invite message is a request for a RTSP setup, comprising a request for a certain bandwidth, which will be required for the requested unicast bearer. AS 102 responds to the re-invite message by setting up a necessary number of RTSP streams. A typical media transmission, will require one audio stream and one video stream, and, thus, for such a scenario, two RTSP setup procedures will be necessary, as illustrated with steps 2:4 and 2:6, respectively, wherein each setup steps are responded to by a 200 OK message in steps 2:5 and 2:7, respectively. UE 100 is notified of a successful setup via a 200 OK message, sent to P-CSCF 108 in a step 2:8, and forwarded to UE 100 in a subsequent step 2:9. From this moment, a unicast bearer is established between MCF/MDF 105 and UE 100, as a consequence, resources necessary for maintaining the bearer are also tied up.

If a resource reservation system is in place, an optional bandwidth reservation procedure may commence at this stage. For a fixed UE, such a procedure may typically be performed according to known TISPAN standards, as indicated with the optional steps 2:10a-2:10h. For a mobile UE, a corresponding bandwidth reservation procedure according to 3GPP standards may be executed instead. For a 3GPP implementation, RACS 200 will also be replaced by a Policy Charging Rule Function (PCRF).

In a step 2:10a an additional re-invite message, requesting for additional bandwidth, is transmitted to P-CSCF 108, which transmits a bandwidth resource reservation request to a Resource and Admission Control System (RACS) 200 in a subsequent a step 2:10b. If the required resources are available, RACS 200 responds by sending an OK message, according to the Diameter AAA protocol, to P-CSCF 108, as indicated with step 2:10c. The re-invite message is then forwarded to AS 102 in a subsequent step 2:10d, which is responded to with a 200 OK in a next step 2:10e. The reserved bandwidth is then committed in step 2:10f, and verified with another OK message, sent to P-CSCF 108 in another step 2:10g, and forwarded to UE 100 in a step 2:10h.

The UE 100 is now ready to leave the multicast bearer, by transmitting an Internet Group Management Protocol (IGMP) leave to a Digital Subscriber Line Access Multiplexer (DSLAM) or the IP Edge router (not shown). This is indicated with another step 2:11.

As indicated with a subsequent step 2:12, UE 100 activates the unicast session by streaming control signalling, e.g. by transmitting an RTSP trick play command, such as e.g. RTSP PLAY, to MCF/MDF 105. The RTSP trick play command is responded to by MCF/MDF 105, with a 200 OK message, sent in a step 2:13. Optionally, the streaming control signalling may be executed in two steps, i.e. between UE 100 and AS 102, followed by forwarding the command from AS 102 to MCF/MDF 105. At this stage MCF/MDF 105 can start to transmit the media stream via unicast, as indicated in a final step 2:14.

However, switching from a multicast stream to a unicast stream typically results in a delay which is a disturbing obstacle for the service and/or network provider in its aim to offer a smooth and non-interrupted user experience. The experienced delay may have different causes, such as, e.g. the signalling between the UE and the stream control nodes, the bandwidth reservation made during the bandwidth renegotiation, the control signalling between the stream control nodes and the media servers, the setting-up of unicast streams for playout in the media servers, the delivery of the unicast stream, and/or the required buffering of the unicast stream.

Yet another problem with unicast solutions is that they are inherently resource limited, where typically the resource requirement grows linearly with the number of users tuned into unicast streaming, thereby causing problems to present scheduling mechanisms. It is therefore from a service deployment perspective advisable to limit the number of unicast connections to a minimum and to use these connections only on occasions when it is necessary.

SUMMARY

It is an object of the present invention to address at least the problems outlined above. More specifically, it is an object of the present invention to provide a method, a user equipment and an application server adapted to execute a smooth switching of a media session from multicast and unicast delivery. According to the presented embodiments, such a switching mechanism is achieved by introducing a preparatory phase which is executed prior to the actual switching phase. The claimed invention also relates to a method and an application server adapted to provide an efficient scheduling of such a switching procedure.

According to a first aspect, a method of switching a media session, delivered from a content server to a user equipment via a multicast bearer of an IP network, from multicast to unicast delivery, is provided. Upon having recognised a preparation trigger, the user equipment initiates a preparation phase, which includes the step of preparing the content server for a unicast bearer. Subsequent to having initiated the preparation phase and in response to having recognised a release trigger, the user equipment initiates a release phase. The release phase comprises the step of releasing the multicast bearer and requesting the content server to resume transmission of the media session via the unicast bearer.

According to another aspect a method providing for a switching of a media session, delivered from a content server to a user equipment via an IP network, from multicast to unicast delivery, is provided. Upon receiving a request from the user equipment, and recognising that the request is a request for preparing the content server for a unicast bearer, the application server executes the requested preparation step by executing a configuration of the multicast session. Subsequent to the configuration the application server receives and recognises a response to the request. The response is transmitted to the user equipment, with the configuration data associated with the unicast bearer preparation attached. The described method enables a smooth switching from multicast to unicast delivery, wherein the preparation phase may reduce the delay to such an extent that a non-interrupted user experience is achieved.

According to yet another aspect, a method for providing scheduling unicast delivery to one or more user equipments, receiving a media session, transmitted via multicast from a content server via an IP network, is provided.

In a first step, a selection trigger, indicating that a predefined trigger event has occurred, is recognised by the application server. Such a trigger may be received from a media control function, or recognised internally by recognition functionality of the application server.

In response to such a trigger the application server retrieves an indication of the amount of resources currently available for unicast delivery from the media control function. On the basis of at least some predefined selection criteria, in combination with the retrieved resource indication, the application server evaluates conditions for triggering one or more of the user equipments to initiate a preparation phase. After the evaluation phase, the application server triggers each of the selected user equipments by transmitting a preparation trigger to the respective user equipment.

By implementing a scheduling method according to the suggested embodiment, a more efficient utilisation of the resources available for multicast and unicast transmission may be achieved. In addition, the scheduling method may also provide an efficient mechanism for providing a smooth transition between different scenes delivered via multicast and unicast, respectively, according to, e.g. personalized information.

The claimed invention also refers to a user equipment, which may be a mobile or a stationary user equipment, and an application server, which may be e.g. a signalling control function, adapted to be used in accordance with the methods described above.

BRIEF DESCRIPTION OF THE DRAWINGS

The present invention will now be described in more detail by means of exemplary embodiments and with reference to the accompanying drawings, in which.

DETAILED DESCRIPTION

In order to confront at least some of the deficiencies which are presently known when switching from multicast to unicast, we introduce a preparatory phase, which is to be executed prior to the actual switching. One intention with the preparatory phase is to prepare a UE presently receiving TV services via multicast for an upcoming switch to unicast.

By introducing such a preparatory phase, it will be possible to obtain a smooth switching, which causes less delay and provides a non-interrupted user experience to the end user. In addition, the introduction of the preparatory phase also reduces the amount of resources that has to be tied up during and prior to the switching, executed during a subsequent release phase.

The claimed invention also relates to a scheduling method which is enabled to schedule unicast sessions on the basis of the current resource utilization, thereby making a more efficient use of the available resources, available for unicast and multicast.

A method for obtaining such a switching procedure, according to one embodiment, will now be described in more detail with reference to FIG. 3.

A UE 100 is receiving a media stream which is multicasted from a content server, typically a MCF/MDF 105. In an initial step 3:1, a predefined trigger event triggers a first trigger, in this context referred to as a preparation trigger, to initiate the preparation phase mentioned above. This trigger is a trigger that may be initiated either manually by the end user of the UE, or automatically, e.g. in response to receiving some indication of an upcoming advertisement/commercial break in the streamed service, and has a purpose of preparing entities involved in an ongoing service delivery for an upcoming switch from multicast to unicast. A method for initiating and scheduling such a trigger, and the associated preparation phase, will be described in further detail later in this document, with reference to FIG. 5.

Figure 3:
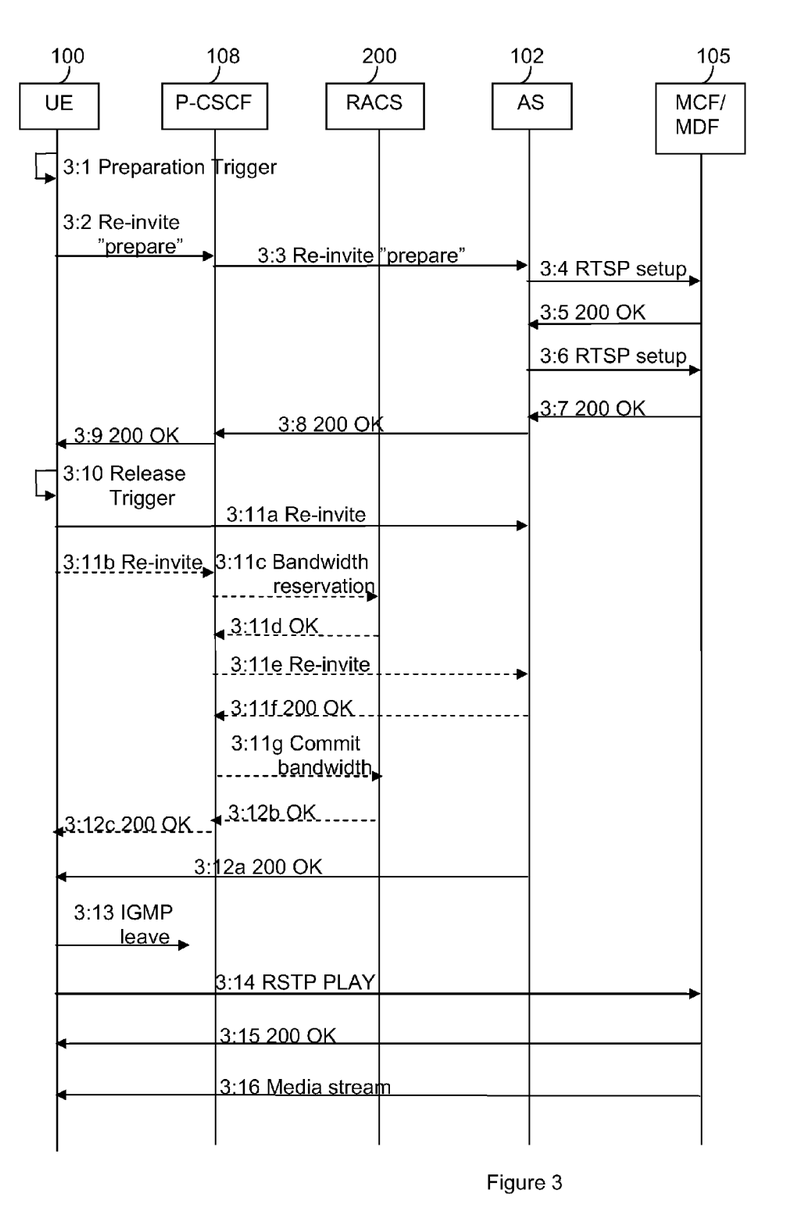
FIG. 3 is a signalling scheme illustrating a method for switching a media session from multicast to unicast, according to one embodiment.

According to the embodiment illustrated in FIG. 3, the preparation phase is initiated with a modified re-invite message, here referred to as a re-invite "prepare" message, which is generated at UE 100, transmitted to a P-CSCF 108 in a step 3:2, and forwarded to AS 102 in a subsequent step 3:3.

Compared to a conventional re-invite message, the re-invite prepare message does not request for any bandwidth or network resources, and instead of assigning resources for a unicast bearer it performs a unicast bearer preparation procedure at the server side, resulting in a configuration of the ongoing multicast session, typically comprising the allocation of an IP-address, port number, and a session identity, e.g. RTSP session ID, for a unicast bearer at the MCF/MDF 105. The re-invite prepare message used in the described example may be recognised by a network node by the fact that no resources are assigned. Alternatively, the re-invite message may have a "re-invite prepare message" flag which, when set, indicates that it is a re-invite prepare message. According to the present embodiment, AS 102 responds to the reception of a re-invite prepare by performing a RTSP setup via session configuration signalling, as indicated with a next step 3:4. A successful preparation is reported to AS 102 in a 200 OK message, as indicated with a subsequent step 3:5.

As indicated in the previous embodiment, unicast delivery typically requires more than one stream, and, thus, a second RTSP setup is executed by AS 102 in a step 3:6, followed by a responding 200 OK message, which is sent to AS 102 in another step 3:7.

Next AS 102 responds with a 200 OK message, which is sent to UE 100 in a step 3:8 and a subsequent step 3:9, terminating the preparation phase. This 200 OK message will comprise the configuration data mentioned above. At least some of this data will later be used by UE 100 for coordination, when initiating a media steam distribution via unicast, via stream control signalling, e.g. by sending a trick play command to the content server.

Once the preparation phase has been completed, UE 100 is prepared and ready for a smooth and fast switching from multicast to unicast streaming. The actual switching is triggered by a second trigger event, which is triggering a second trigger, here referred to as a release trigger, as indicated with a step 3:10. The release trigger, which may occur at any time subsequent to the termination of the preparation phase, initiates a second phase, here referred to as the release phase. The release trigger event, which is an indication to execute the prepared switching to unicast, may be defined, e.g. by the termination of a pre-set timer, the occurrence of a splicing item in the present media stream, the reception of a trigger message, or by a manually initiated activity, such as, e.g. the activation of an icon on the TV screen, manually selected by the end user.

In response to this second trigger, UE 100 generates and transmits another re-invite message to AS 102. This time, however, the present bandwidth is negotiated in order to meet the demand from the unicast bearer, and, thus, this re-invite message comprises an indication of a required bandwidth. If no resource reservation system is available in the IP transport network, the re-invite message is sent to AS 102, as indicated with a next step 3:11*a*, and the re-invite message is responded to with a 200 OK message, as indicated with a subsequent step 3:12*a*.

Figure 2:
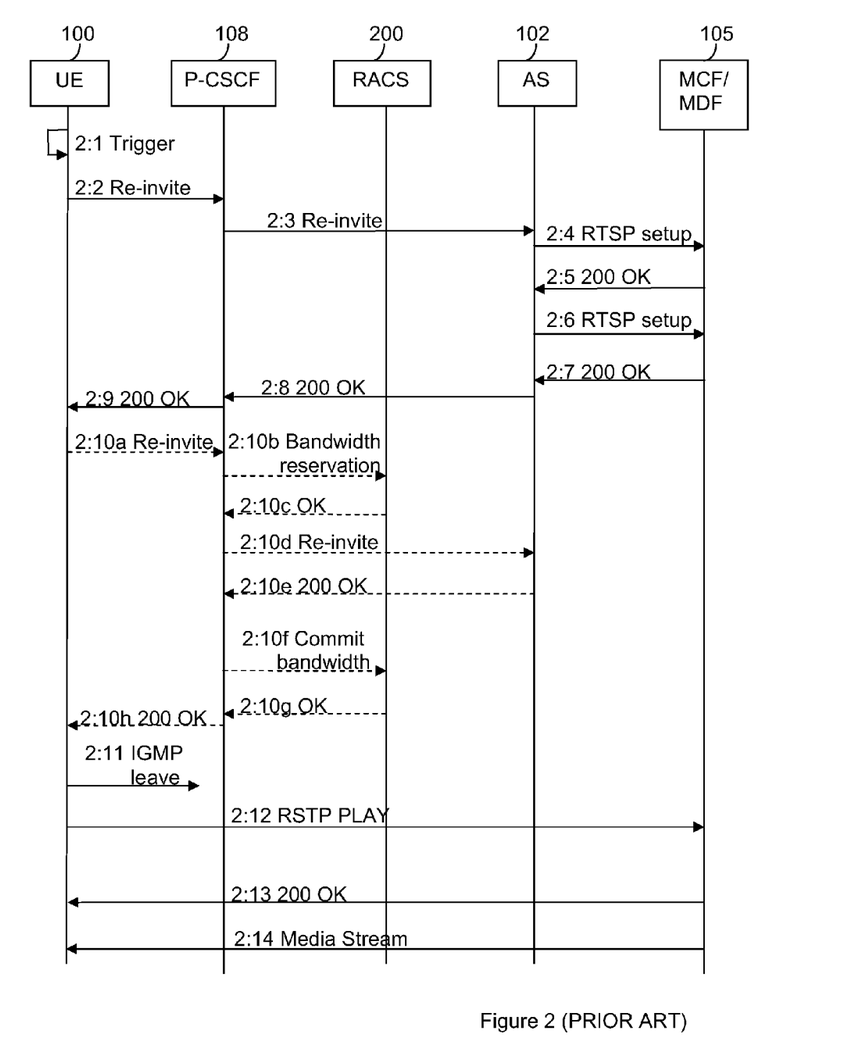
FIG. 2 is a signalling scheme illustrating a method for switching from multicast to unicast, according to the prior art.

If, however, resource reservation is provided for, a resource reservation procedure may be performed in steps 3:11*b*-3:11*g*, and steps 3:11*b* and 3:11*c*, according to the bandwidth reservation procedure described in the prior art solution of FIG. 2.

Next, the multicast bearer is released by UE 100, transmitting a IGMP leave to the IP edge/DSLAM, as indicated with another step 3:13, followed by stream control signalling, performed via a trick play command, in this case RTSP PLAY, to MCF/MDF 105, in a step 3:14. RTSP PLAY is an indication for MCF/MDF 105 to start to deliver the selected stream to UE 100 via unicast. In order to coordinate the RTSP setup, i.e. the session configuration signalling, executed in the preparation phase, with the streaming control signalling, performed by the RTSP PLAY, relevant configuration data will be required. This configuration data, which was provided from AS 102 to UE 100 in a 200 OK in the preparation phase, is now provided to MCF/MDF 105 attached to the trick play command. MCF/MDF 105 responds to AS 102 with a 200 OK message in a step 3:15. As mentioned for the prior art scenario, the steaming control signalling may alternatively be executed as a two step signalling procedure via AS 102.

The continuing transmission of the media stream will now be performed directly from MCF/MDF 105 to UE 100 via the unicast bearer, as indicated in a final step 3:16.

A UE may obtain content by downloading the content using TCP, or HTTP download stream control, instead of via RTSP streaming. A method for downloading content to a UE, according to another embodiment, will therefore now be described in further detail with reference to FIG. 4.

Figure 4:
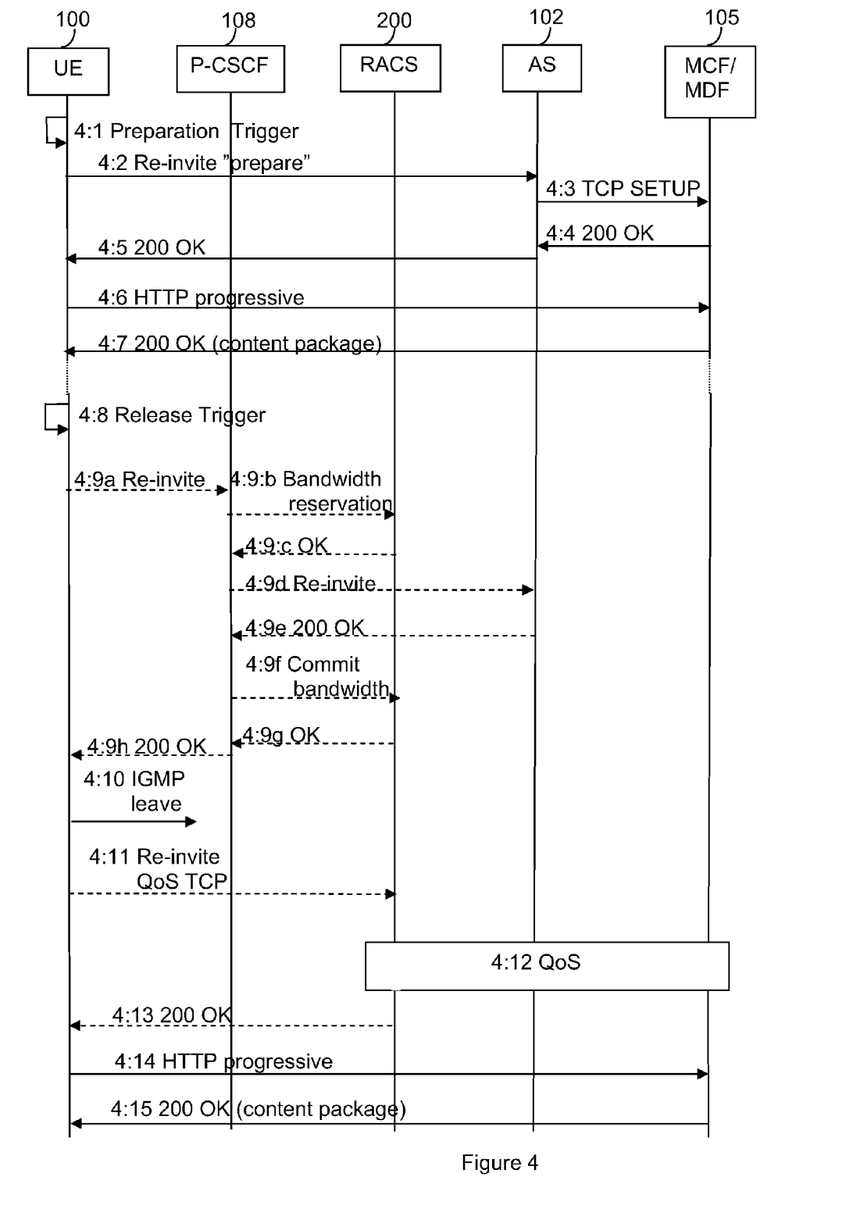
FIG. 4 is a signalling scheme illustrating a method for switching a media session from multicast to unicast, according to another embodiment.

A UE 100 presently receiving a current multicast session, recognises an upcoming demand to leave the multicast bearer. Such a demand is initiated by a preparation trigger event, triggering the preparation trigger, as indicated in a first step 4:1. In resemblance to the previous embodiment, the preparation trigger event may be defined as a manual activity to be entered by the end user, or as an event which is activated automatically.

The preparation trigger initiates a preparation phase, during which the UE 100 will be receiving downloaded content on a unicast bearer in parallel to receiving content on a multicast bearer. In a next step 4:2, UE 100 transmits a re-invite prepare message to AS 102, with the purpose of indicating a demand for a unicast bearer to AS 102. In a subsequent step

4:3 AS 102 configures MCF/MDF 105, by setting up a TCP communication between MCF/MDF 105 and UE 100, in parallel with the present multicast bearer. In order not to tie up more resources than necessary, the TCP unicast bearer is typically chosen on a best effort level. MCF/MDF 105 responds to AS 102 with a 200 OK message, as indicated with a step 4:4, and AS 102 forwards the 200 OK message to UE 100 in a subsequent step 4:5.

At a next step 4:6, UE 100 starts a procedure which corresponds to the trick play procedure described in the former embodiment, namely to download content progressively, e.g. by transmitting a HTTP progressive download to MCF/MDF 105, and content packages are returned to UE 100 in one or more 200 OK messages, as indicated with a step 4:7. In resemblance to the former embodiment, the configuration data, provided with the 200 OK message in step 4:5, associated with the TCP setup, is used to coordinate this setup with the HTTP communication, or with an alternative TCP connection.

By continuously caching the received media content, UE 100 will be able to play-out the content at a later occasion, e.g. when the UE is performing the switching from the multicast bearer, thereby obtaining a smooth transition from multicast to unicast delivery.

If the load of the cache of UE 100 reach a critical level, UE 100, may choose to occasionally reduce the transmission pace, e.g. by sending one or more HTTP commands, such as, e.g. HTTP progressive slow, to MCF/MDF 105, keeping the session alive, but reducing the amount of received content, as well as the reception load.

In a next step 4:8, a second trigger event, i.e. a release trigger event, initiates a release phase. The release trigger event may be defined e.g. by a cache threshold being exceeded, the expiry of a timer, the recognition of a splicing item or any other indication in the received media steam, or a manually entered command.

In resemblance to the former embodiment, UE 100 may initiate a bandwidth reservation at this stage. Such a procedure is indicated with optional steps 4:9a-4:9h.

The trigger triggers UE 100 to leave the current multicast bearer, typically by invoking IGMP leave, as indicated with a step 4:10. In addition to leaving the multicast bearer, UE 100 may also initiate an optional QOS modification procedure of the existing best effort TCP connection by sending a re-invite message, comprising a request for a required QOS, in the existing SIP session, as indicated with the subsequent steps 4:11-4:13. In the following steps 4:14 and 4:15, UE 100 continues to transmit content, but from now on only via unicast delivery.

If a pre-defined cache threshold, defining the release trigger, has been set to correspond to a time interval, $T_{playout}$ defining the time it takes to play out the content from the cache, and if this time exceeds the switching time, $T_{switch}$, i.e. the time it is estimated that is takes to switch from multicast reception to reception of the same content over the unicast bearer, the switch from multicast to unicast will be experienced as a seamless switch by the end user.

The preparation for unicast, which is achieved by sending a re-invite prepare message in the first step of the embodiments described above, may be triggered by any of a number of possible events in order to provide a smooth and fast switching from multicast to unicast. A method for scheduling switching between multicast and unicast delivery according to one exemplary embodiment will now be described in more detail with reference to the signalling diagram of FIG. 5. The scheduling mechanism described in FIG. 5 is based on the current resource utilisation, and more specifically on the resources presently available for unicast delivery.

If for example the present media distribution system has been dimensioned to handle a certain amount of unicast streams commonly requested at a busy hour, the media servers of the system will be under-utilized most of the time. The basic concept behind the scheduling mechanism about to be described is to utilize these resources for other purposes, when such resources are available. One typical implementation for such a scheduling mechanism is personalized advertising. If there is an upcoming commercial break for a certain channel, the scheduling mechanism can take this into consideration, and if necessary resources are available it can decide to trigger one or more UEs to switch over to personalized, unicast based advertising according to any of the embodiments described above. In addition to considering the current resource utilisation, the scheduling mechanism may also take other information in consideration.

Figure 5:
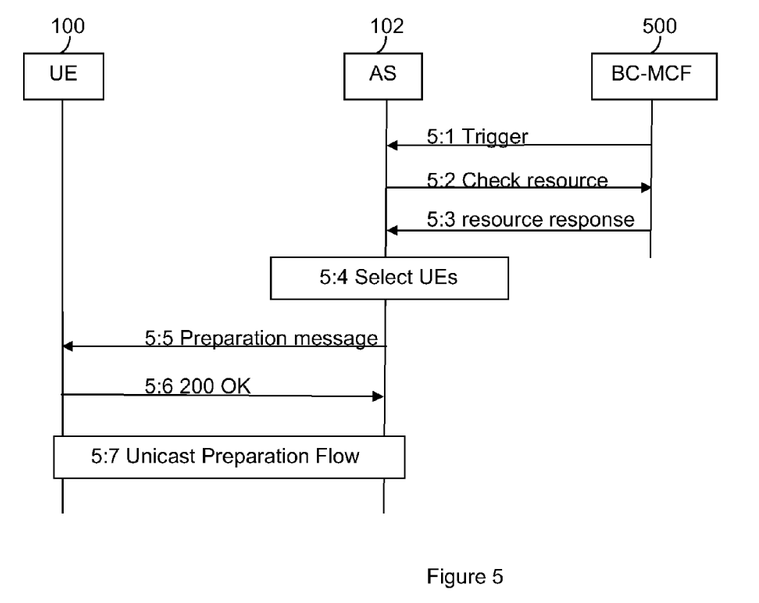
FIG. 5 is a signalling diagram illustrating a method for triggering any of the switching methods described with reference to FIG. 3 or 4, according to one embodiment.

In FIG. 5 a UE 100 is receiving a multicast session according to any of the previous embodiments. Apart from providing the conventional application server functionality, AS 102 is also provided with functionality for scheduling multicast to unicast switching. By implementing such a scheduling mechanism, an even more efficient utilisation of the available bearers, and the resources supporting these bearers, may be obtained. The proposed scheduling method may also provide an automated switching which requires no or minimal interaction from the end users. Although, for simplicity reasons, only one UE is shown in the figure, it is to be understood that a typical system comprising the proposed scheduling mechanism is serving a plurality of UE's which are in connection with AS 102.

From the service providers perspective it may be preferable to be able to utilise a natural break in a media session for personalized unicast distribution, and, thus, preparations for a smooth switching to unicast for one or more selected UEs may be achieved by performing the proposed switching preparation procedure.

In a first step 5:1, a trigger, referred to as the selection trigger, is transmitted to AS 102 from a Control Function, in this case a Broadcast Media Control Function (BC-MCF) 500. The selection trigger is initiated by some predefined trigger event specified for the present media session, which may be based, e.g. on the available resources, on a playlist for commercials, or the occurrence of a splicing point in the transmitted media stream. One such event may be that a commercial advertisement break is about to occur in the media stream, which is recognised by BC-MCF 500. Alternatively, such a trigger may be recognised by the AS 102, directly.

In response to the selection trigger, AS 102 transmits a resource request to BC-MDF 500, requesting BC-MCF 500 for an indication of the amount of resources that are available for unicast for the present session. Such a request is indicated with a step 5:2, and responded to by BC-MCF 500 in a subsequent step 5:3.

In a next step 5:4, a selection criteria of AS 102 is activated for evaluating predefined conditions in order to determine which (if any) UEs that are to be triggered to initiate a preparation phase, preparing for an upcoming switch, prior to initiating the actual switching procedure. As indicated above, the selection is based on the current resource utilization. Typically, this information is combined with additional personalized information, such as e.g. statistics of previously transmitted resource requests, or of any other relevant and accessible information, personalized user profiles, or the end users subscription category. Different information may be considered either alone, or in a certain combination, all according to the relevant configuration.

For each UE that fulfil the predefined criteria, AS 102 sends a unicast preparation message, e.g. a SIP INFO message, which will be interpreted by the UE as a trigger to initiate the described preparation phase. This is indicated with a next step 5:5. As indicated above, a typical selection procedure, executed in step 5:4, will result in a plurality of unicast preparation messages, each of which will be transmitted to a selected UE.

In response to a unicast preparation message, UE 100 sends a 200 OK message to AS 102, as indicated with a step 5:6, and in a final step 5:7, UE 100 performs a unicast preparation flow, i.e. the preparation phase is triggered and executed according to any of the embodiments described above.

Once the preparation phase has been executed, the release trigger will initiate the actual switching, as indicated in any of the embodiments described above. In the present case, the switching may typically be triggered e.g. by the UE 100 recognising a splicing point in the received media session, or the timeout of a predefined timer.

For a fixed UE, such as e.g. a STB or for a mobile UE, such as e.g. a cellular telephone, to be able to use the described method according to any of the described embodiments, some modifications will be required. The UE must be able to generate a re-invite prepare message when required, as well as to recognise the preparation and the release trigger. A simplified block scheme of such a user equipment, according to one embodiment, will now be described with reference to FIG. 6, where only functionality which is necessary for the understanding of the proposed mechanisms has been included, while other common functionality has been omitted for simplicity reasons.

Figure 6:
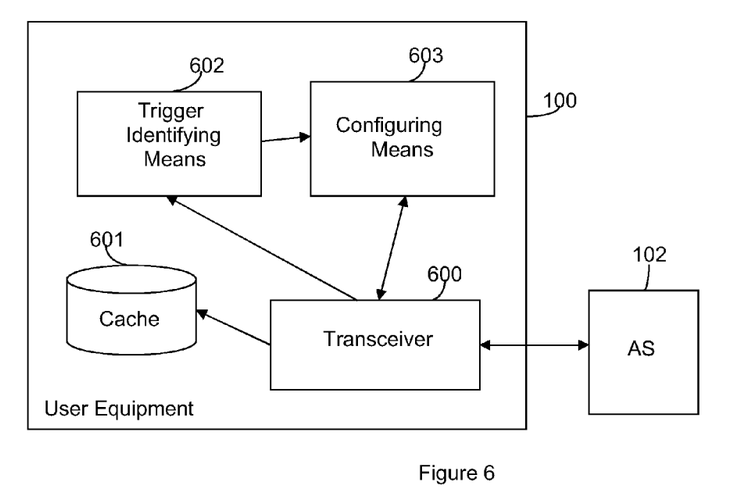
FIG. 6 is a block diagram illustrating a user equipment adapted to be used when executing any of the methods described with reference to FIG. 3, 4 or 5, according to one embodiment.

UE 100 comprises a conventional transceiver 600, which is adapted to receive content provided from a content provider, as well as associated signalling, and to transmit signalling and content associated with a media session. UE 100 also comprises a conventional cache 601, adapted to cache received content in conventional manners. In addition UE 100 is provided with a trigger identifying means 602, adapted to recognise triggering events which have been configured to trigger the preparation phase, as well as the release phase, respectively, as described above. The trigger identifying means 602 may be adapted to recognise triggers received as a message via the transceiver 600, as a command entered or selected by an end user, via a conventional GUI, and/or as an instruction generated internally by a process or function of the UE 100. UE 100 also comprises a Configuring Means 603. The configuring means 603 is adapted to generate a re-invite prepare message, or a conventional re-invite message, whenever applicable, in response to the trigger identifying means having identified an associated trigger, or trigger event. Upon receiving a response message, e.g. a 200 OK message, responding re-invite prepare message, the configuration means 603 has been adapted to recognise this response message, as being a response message to a re-invite prepare message or a conventional re-invite message, so that the configuration data provided with a response to a re-invite prepare message can be handled accordingly. Configuration means 603 is also adapted to coordinate a RTSP or TCP setup with any streaming control signalling or trick-play command, by recognising and adding the relevant configuration data to the relevant session. Remaining steps which are to be taken during a switching process are considered to be performed in a conventional manner, using conventional UE architecture and communication protocols. If re-invite prepare message is to be identified with a specific re-invite message flag, the configuration means may also be adapted to set that flag whenever a re-invite prepare message is to be transmitted from the UE.

Also an Application Server, e.g. a Signalling Control Function (SCF), has to be adapted to be able to operate in accordance with any of the embodiments described above. A simplified block scheme, describing only the functionality which is essential for the understanding of the described mechanism, will therefore be presented with reference to FIG. 7.

Figure 7:
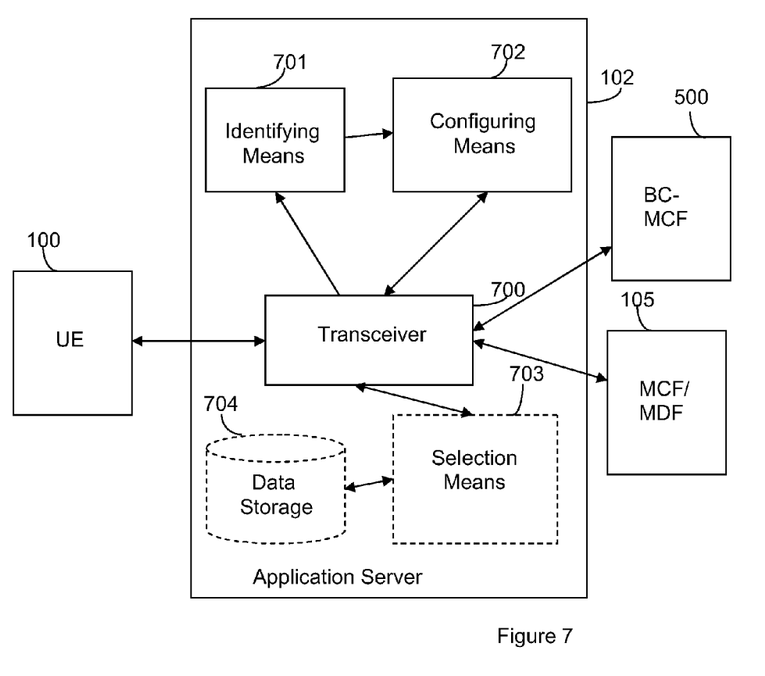
FIG. 7 is a block diagram illustrating an application server adapted to be used when executing any of the methods described with reference to FIG. 3, 4 or 5, according to one embodiment.

AS 102 comprises a conventional Transceiver 700, adapted to communicate with the server side, distributing media sessions via multicast and unicast, and the client side, i.e. UEs consuming the services available from a content provider. AS 102 also comprises Identifying Means 701, adapted to distinguish a re-invite prepare message from a conventional one. Depending on the configuration, the identifying means 701 may be adapted to recognise a re-invite prepare message on the basis of its content, e.g. no bandwidth requirements, or by checking if a re-invite prepare message flag is set or not. AS 102 also comprises Configuration Means 702, adapted to handle re-invite prepare messages which have been identified by the identifying means 701, accordingly. The identifying means 701 is also adapted to recognise response messages, responding to a re-invite prepare message, as well as response messages responding to a conventional re-invite message. If a response message has been identified as a response to a re-invite prepare message, configuration means 702 is also adapted to provide relevant configuration data to UE with the response message.

If the AS 102 is configured also to provide the scheduling mechanism, described above, AS 102 also comprises a Selection Means 703. The selection means 703 is adapted to respond to a selection trigger, received from a media control function, by transceiver 700, by requesting the amount of resources available for unicast from the media control function. Once aware of the amount of available resources, selection means 703 is adapted to determine which one or more UEs that fulfils the predefined criteria, for initiating a preparation phase, which has been specified for the scheduling function. This selection procedure is typically executed by combining the obtained current resource information with data, such as e.g. personalized user profiles, obtained from a data storage 704. For every UE that fulfil the predefined criteria, selection means 703 is adapted to generate a unicast preparation message, which is sent to the respective UE via transceiver 700.

While the present invention has been illustrated and described with reference to specific exemplary embodiments, it is to be understood by anyone of ordinary skill in the art that various changes in form of details may be made therein without departing from the spirit and scope of the present invention as defined by the following claims. Instead of using trick play commands a UE may for example instead be configured to communicate with a content server via another type of corresponding signalling.

Therefore it is to be understood that the above-described exemplary embodiments have been provided only in a descriptive sense and will not be construed as placing any limitation on the scope of the invention.

ABBREVIATION LIST

BC-MCF BroadCasting MCF
DSLAM Digital Subscriber Line Access Multiplexer
IGMP Internet Group Management Protocol
MCF Media Control Function
MDF Media Distribution Function N-PVR Network based Personal Video Recorder
RACS Resource and Admission Control System
RTSP Real Time Streaming Protocol
SCF Signalling Control Function
PCRF Policy and Charging Rule Function

The invention claimed is:

1. A method implemented by a user equipment for switching a media session from multicast to unicast delivery, the media session being delivered from a content server to the user equipment via a multicast bearer of an IP network, the method comprising:
   initiating, by the user equipment, a preparation phase responsive to recognizing a preparation trigger, said preparation phase comprising the user equipment:
      requesting an application server to configure the content server for a unicast bearer; and
      receiving, from the application server in response to the request to configure the content server, configuration data reflecting how the content server has been configured for the unicast bearer;
   initiating, by the user equipment, a release phase responsive to recognizing a release trigger subsequent to having received the configuration data, said release phase comprising the user equipment:
      negotiating an associated bandwidth for the unicast bearer;
      releasing the multicast bearer; and
      requesting that the content server resume transmission of the media session via the unicast bearer.

2. The method of claim 1, wherein the user equipment refrains from negotiating the associated bandwidth for the unicast bearer until after the configuration data is received.

3. The method of claim 2, wherein said release phase further comprises providing said configuration data to the content server in the request to resume transmission via said unicast bearer.

4. The method of claim 3, wherein requesting the content server to resume transmission via said unicast bearer comprises sending a trick play command.

5. The method of claim 2:
   wherein the user equipment requests the application server to configure the content server for the unicast bearer by transmitting a re-invite prepare message;
   wherein the user equipment receives the configuration data in a 200 OK message.

6. The method of claim 1, wherein said release phase further comprises coordinating a Real Time Streaming Protocol (RTSP) streaming control signaling executed in said release phase with an RTSP setup executed in said preparation phase by identifying configuration data associated with said RTSP setup.

7. The method of claim 1, wherein said unicast bearer is a unicast streaming bearer.

8. The method of claim 1, wherein the user equipment requests the application server to configure the content server for the unicast bearer in parallel with the multicast bearer.

9. The method of claim 8, wherein said unicast bearer is a Transmission Control Protocol (TCP) download or Hypertext Transfer Protocol (HTTP) download bearer on a best effort level.

10. The method of claim 8, wherein said preparation phase further comprises:
    requesting for content delivery via progressive download;
    receiving content via one or more response messages; and
    caching said received content.

11. The method of claim 10, wherein said content delivery request is an HTTP download request and the one or more response messages are 200 OK messages.

12. The method of claim 8, wherein said release trigger is a predefined cache threshold corresponding to a predefined time interval, Tplayout, said cache threshold chosen so that Tplayout >Tswitch wherein Tswitch is an estimated switching time.

13. The method of claim 1, wherein said preparation trigger or said release trigger comprises any of:
    a splicing point in the received media stream;
    a timeout of a timer;
    a trigger message;or
    a manual activation entered by a user of said user equipment.

14. The method of claim 1, wherein the user equipment negotiating the associated bandwidth comprises the releasing of the multicast bearer.

15. The method of claim 1, wherein the user equipment negotiating the associated bandwidth comprises initiating a resource reservation process requesting a guaranteed bandwidth subsequent to the releasing of the multicast bearer.

16. A method implemented by an intermediate application server for switching a media session from multicast to unicast delivery, said media session being delivered from the content server to a user equipment via a multicast bearer of an IP network, the method comprising:
    receiving a request from the user equipment requesting that the content server be configured for a unicast bearer;
    configuring the content server for the unicast
    sending, after the configuring, configuration data to the user equipment, the configuration data reflecting how the content server has been configured for the unicast bearer;
    negotiating, with the user equipment, an associated bandwidth for the unicast bearer, the negotiating being subsequent to the sending of the configuration data.

17. The method of claim 16, wherein the intermediate application server refrains from negotiating the associated bandwidth for the unicast bearer until after the transmitting of the configuration data.

18. The method of claim 16, wherein configuring the content server for a unicast bearer comprises setting up the unicast bearer in parallel with the multicast bearer.

19. A method implemented by an intermediate application server for scheduling unicast delivery of a media session to at least one user equipment receiving the media session from a content server via an IP network, the method comprising:
    recognizing a selection trigger that indicates a predefined trigger event has occurred;
    responsive to the selection trigger, retrieving from a media control function an indication of the amount of resources currently available for unicast delivery;
    selecting, based on at least one predefined selection criteria in combination with the retrieved resource indication, at least one user equipment to initiate a preparation phase, the preparation phase comprising the user equipment:
        requesting an application server to configure the content server for a unicast bearer;
        receiving, from the application server in response to the request to configure the content server, configuration data reflecting how the content server has been configured for the unicast bearer prior to switching from multicast to unicast; and
    triggering each selected user equipment to initiate the preparation phase, by transmitting a preparation trigger to those user equipments.

20. A user equipment configured to switch from multicast to unicast reception of a media session, said media session being delivered from a content server to said user equipment via a multicast bearer of an IP network, said user equipment comprising:

a processor and a memory, the memory containing instructions executable by the processor whereby the user equipment is configured to:

recognize a preparation trigger;

initiate a preparation phase responsive to recognizing the preparation trigger, the preparation phase comprising the user equipment:

requesting an application server to configure the content server for a unicast bearer;

receiving, from the application server in response to the request to configure the content server, configuration data reflecting how the content server has been configured for the unicast bearer prior to switching from multicast to unicast;

recognize a release trigger; and initiate a release phase responsive to recognizing the release trigger subsequent to having received the configuration data, the release phase comprising the user equipment:

negotiating an associated bandwidth for the unicast bearer;

releasing the multicast bearer; and requesting that the content server resume transmission of the media session via the unicast bearer.

21. The user equipment of claim 20, wherein said user equipment is a mobile user equipment.

22. The user equipment of claim 20, wherein said user equipment is a stationary user equipment.

23. An application server adapted to participate in a switching of a media session from multicast to unicast delivery, said media session being delivered from a content server to a user equipment via an IP network, said application server comprising:

a processor and a memory, the memory containing instructions executable by the processor whereby the application server is configured to:

receive a request from the user equipment requesting that the content server be configured for a unicast bearer;

configure the content server for the unicast bearer;

send, after the configuring, configuration data to the user equipment, the configuration data reflecting how the content server has been configured for the unicast bearer;

negotiate, with the user equipment, an associated bandwidth for the unicast bearer, the negotiating being subsequent to the sending of the configuration data.

24. The application server of claim 23, wherein said application server is a signaling control function.

25. An intermediate application server adapted to schedule unicast delivery of a media session to at least one user equipment receiving the media session from a content server via an IP network, said intermediate application server comprising:

a processor and a memory, the memory containing instructions executable by the processor whereby the intermediate application server is configured to:

recognize a selection trigger that indicates a predefined trigger event has occurred;

retrieve an indication of the amount of resources currently available for unicast delivery;

select based on at least one predefined selection criteria in combination with the retrieved resource indication, at least one user equipment to initiate a preparation phase, the preparation phase comprising the user equipment:

requesting an application server to configure the content server for a unicast bearer;

receiving, from the application server in response to the request to configure the content server, configuration data reflecting how the content server has been configured for the unicast bearer prior to switching from multicast to unicast;

generate a preparation trigger for each selected user equipment; and transmit the generated preparation triggers to the respective user equipments.

26. The intermediate application server of claim 25, wherein the intermediate application server is a signaling control function.

* * * * *

UNITED STATES PATENT AND TRADEMARK OFFICE
CERTIFICATE OF CORRECTION

PATENT NO.        : 8,973,057 B2                                              Page 1 of 1
APPLICATION NO.   : 12/995760
DATED             : March 3, 2015
INVENTOR(S)       : Cedervall et al.

It is certified that error appears in the above-identified patent and that said Letters Patent is hereby corrected as shown below:

Title page, illustrative fig., for Step "3:14", in Line 1, delete "RSTP PLAY" and insert
-- RTSP PLAY --, therefor.

Drawings
In Fig. 2, Sheet 2 of 6, for Step "2:12", in Line 1, delete "RSTP PLAY" and insert -- RTSP PLAY --,
therefor.

In Fig. 3, Sheet 3 of 6, for Step "3:14", in Line 1, delete "RSTP PLAY" and insert -- RTSP PLAY --,
therefor.

Specification
In Column 3, Lines 61-65, delete "The................achieved." and insert the same at Line 62,
as a new paragraph.

In Column 7, Line 44, delete "QOS" and insert -- QoS --, therefor.

In Column 7, Line 46, delete "QOS," and insert -- QoS, --, therefor.

In Column 7, Line 52, delete "$T_{playout}$" and insert -- $T_{playout}$, --, therefor.

In Column 8, Line 52, delete "BC-MDF" and insert -- BC-MCF --, therefor.

Claims
In Column 12, Line 6, in Claim 12, delete "Tplayout," and insert -- $T_{playout}$, --, therefor.

In Column 12, Line 7, in Claim 12, delete "Tplayout>Tswitch wherein Tswitch" and
insert -- $T_{playout} > T_{switch}$ wherein $T_{switch}$ --, therefor.

In Column 12, Line 30, in Claim 16, delete "unicast" and insert -- unicast bearer; --, therefor.

Signed and Sealed this
Sixth Day of October, 2015

Michelle K. Lee
*Director of the United States Patent and Trademark Office*